United States Patent [19]

Tagawa

[11] 4,040,404

[45] Aug. 9, 1977

[54] FUEL TANK PRESSURE-VACUUM RELIEF VALVE

[75] Inventor: Katsuhiro Tagawa, Fussa, Japan

[73] Assignee: Nisson Motor Company, Limited, Yokohama, Japan

[21] Appl. No.: 650,153

[22] Filed: Jan. 19, 1976

Related U.S. Application Data

[63] Continuation of Ser. No. 442,336, Feb. 14, 1974, abandoned.

[30] Foreign Application Priority Data

Feb. 17, 1973 Japan .................................. 48-20950

[51] Int. Cl.² ............................................. F02M 59/00
[52] U.S. Cl. ..................................... 123/136; 137/493
[58] Field of Search ............. 123/136; 137/493, 493.8, 137/493.1

[56] References Cited

U.S. PATENT DOCUMENTS

| | | | |
|---|---|---|---|
| 3,159,176 | 12/1964 | Russel et al. | 137/493.1 |
| 3,613,718 | 10/1971 | Ballinger | 137/493 |
| 3,616,783 | 11/1971 | La Masters | 123/136 |
| 3,628,517 | 12/1971 | Soberski | 123/136 |
| 3,724,708 | 4/1973 | Burgess | 137/493 |
| 3,730,158 | 5/1973 | St. Amond | 123/136 |
| 3,769,952 | 11/1973 | Feidler et al. | 123/136 |
| 3,785,401 | 1/1974 | Button | 137/493.8 |
| 3,831,801 | 8/1974 | Rodgers | 137/493 |

OTHER PUBLICATIONS

Sarto et al.; Society of Automotive Engineers;"Crysler Evaporation Control System" January 1970, pp. 4–5.

*Primary Examiner*—Carroll B. Dority, Jr.
*Assistant Examiner*—Paul Devinsky

[57] ABSTRACT

Two check valves are connected between a fuel tank and a carbon canister to relieve excessive pressure or vacuum in the fuel tank.

3 Claims, 5 Drawing Figures

FUEL TANK PRESSURE-VACUUM RELIEF VALVE

This is a continuation of application Ser. No. 442,336, filed Feb. 14, 1974, abandoned.

The present invnetion relates to a vapor pressure relief valve for an evaporative emission control system of a motor vehicle.

As is well known, since evaporation loss from a vehicle fuel tank contributes in a considerable degree to contamination of the atmosphere, modern motor vehicles are equipped with fuel tanks with fuel vapor storage units such as carbon canisters through which the fuel tank communicates with the atmosphere.

However, in a conventional system, the fuel vapor storage unit such as the carbon canister is always in contact with fuel vapor from the fuel tank to absorb the fuel vapor. As a result, the storage unit is filled to its capacity relatively early with fuel vapor and its life is shortened.

Accordingly, an object of the present invention is to provide an improved vapor pressure relief valve which can prolong the life of a fuel vapor storage unit.

Another object of the present invention is to provide an improved vapor pressure relief valve to limit the fuel vapor pressure in a fuel tank to prevent breakage of the fuel tank.

A further object of the present invention is to provide a multifunctional valve to limit both the gage pressure and vacuum in a fuel tank.

These and other objects and advantages of the present invention will become more apparent from the following description when taken in conjunction with the attached drawings, in which.

Figure 1:
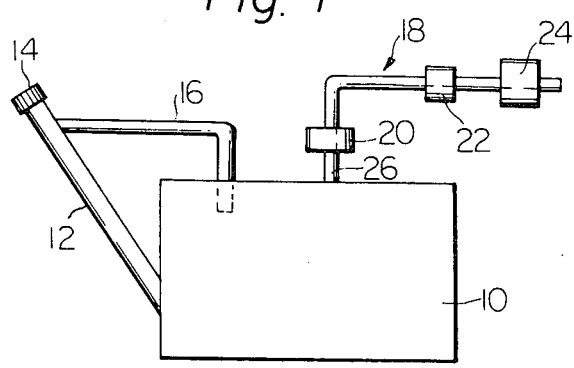
FIG. 1 is a schematic representation of a fuel tank system equipped with an evaporative emission control system, in which a vapor control valve of the present invention is shown.

Referring now to FIG. 1, there is schematically illustrated a fuel tank 10, which is shown as being equipped with an evaporation emission control device which includes a vapor pressure relief valve of the present invention. The fuel tank 10 has, as customary, a filler neck 12 with a cap 14 sealing its upper end and a vent tube 16 which connects the filler neck 12 and the fuel tank 10 at their upper portions. The fuel tank 10 is furthermore equipped with an evaporative emission control device generally indicated as 18. The control device 18 includes a liquid-vapor pressure from the fuel for separating fuel from air-fuel vapor from the fuel tank 10, a vapor pressure relief valve 22 of the present invention and a fuel vapor storage unit 24 such as a carbon canister leading to the vehicle engine crankcase and/or carburetor (not shown). The liquid-vapor separator 20 communicates with the upper portions of the fuel tank 10 through a breathing conduit 26, and also with the vapor pressure relief valve 22 through the breathing conduit 26. The vapor pressure relief valve 22 in turn communicates with the fuel vapor storage unit 24 which in turn communicates with the atmosphere through the breathing conduit 26.

Figure 2:
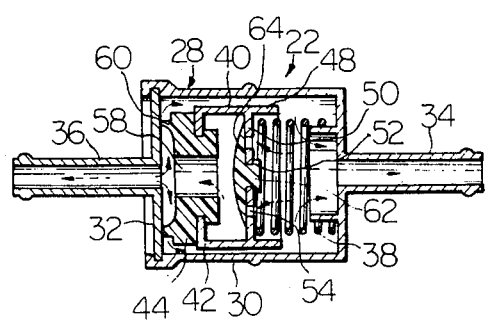
FIG. 2 is a longitudinal sectional view of a vapor pressure relief valve embodying the present invention.

A vapor pressure relief valve embodying the present invention indicated as 22 in FIG. 2 is fully shown in FIG. 2. The valve 22 includes a casing generally indicated as 28, which consists of a cup-shaped body 30 and a cap 32 sealing the opening of the cup-shaped body 30. The cup-shaped body 30 has an outlet 34 in the flat bottom thereof, and the cap 32 has an inlet 36.

Within the casing 28, biasing means 38 such as a compression spring are seated on the bottom surface of the cup-shaped body 30. The biasing means 38 biases a first and second check valve assembly 40. The check valve assembly 40 comprises a first check valve unit (no numeral) including a valve element 42 and a resilient member 44 fixed thereto, and a second check valve unit (no numeral) fixed to the valve element 42. The valve element 42 has a cylindrical portion 48, and a partition 50 integrally formed with the cylindrical portion 48. The partition 50 has a central hole 52 and at least one radially outward hole 54 formed axially therethrough. The valve element 42 is slidable within the body 30.

The resilient member 44 of the valve element 42 is sealingly engagable with the cap 32 to block the inlet 36, and has a central bore 58 and an annular lip portion 60 which sealingly contacts the internal surface of the cap 32. A resilient valve member 62 of the second check valve unit is fixed to the valve element 42 by means of the central hole 52. The element 62 has a flexible flap portion 64 on its periphery, which normally urgingly closes the hole 54, and constitutes a flap valve.

In operation, when the fuel vapor gage pressure in the fuel tank 10 due to fuel vapor expansion exceeds a first predetermined value, air and fuel vapor pass from the fuel tank 10 through the conduit 26 and the liquid-vapor separator 20 into the inlet 36 of the relief valve 22. The vapor then forces the valve element 42 rightward as shown in FIG. 2 against the force of the biasing means 38 and flows around the valve element 42 to the outlet 34. The vapor then passes through the breathing conduit 26 into the fuel vapor storage unit 24 such as the carbon canister which aborbs the fuel vapor and communicates with the open air.

When the fuel vapor pressure in the fuel tank 10 drops below zero gage pressure, due to fuel vapor contraction by more than a second predetermined value atmospheric air passes through the storage unit 24 and the conduit 26 into the outlet 34 of the relief valve 22. The pressure difference forces the flap portion 64 away from the partition 50 so that air flows through the hole 54 and the bore 58 to the inlet 36. The air then flows through the separator 20 and the conduit 26 into the fuel tank 10 to prevent the fuel tank 10 from imploding.

Figure 3:
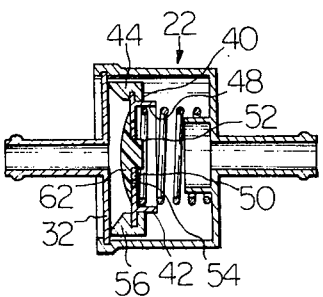
FIG. 3 is a view similar to FIG. 2 but shows a modified embodiment of the vapor pressure relief valve shown in FIG. 2.

FIG. 3 illustrates a modified embodiment of a valve 22 of the invention, which is similar to that shown in FIG. 2 for the except first and second check valve assembly 40. In this modification, the first and second check valve assembly 40 comprises the valve element 42, the resilient member 44 fixed to the valve element 42, the partition 50 the holes 52 and 54, and the resilient valve member 62. The main differences are that the cylindrical portion 48 is shorter and the resilient member 44 is fixed directly to the partition 50, and the inner diameter of the resilient member 44 is approximately that of the cylindrical portion 48 so that the bore 58 is omitted. This relief valve 22 operates in a similar manner to that of FIG. 2.

Figure 4:
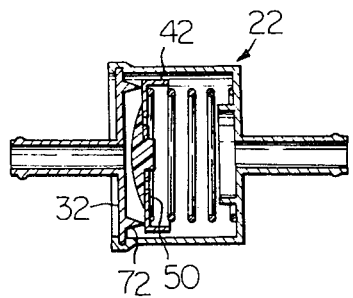
FIG. 4 is a view similar to FIG. 2 but shows another modified embodiment of the vapor pressure relief valve shown in FIG. 2.

FIG. 4 illustrates a further modified embodiment of a valve 22 of the invention, which is similar to that shown in FIG. 4 except that the resilient member 44 is omitted and an annular contact member 72 is provided on the cap 32 for sealing engagement with the partition 50. This relief valve 22 also operates in a similar manner to that of FIG. 2.

Figure 5:
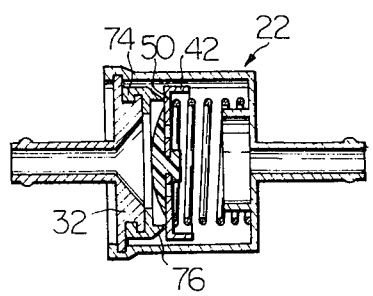
FIG. 5 is a view similar to FIG. 2 but shows still another modified embodiment of the vapor pressure relief valve shown in FIG. 2.

FIG. 5 illustrates a further modified embodiment of a valve 22 of the invention, which is similar to that shown in FIG. 4 except that an annular projection 74 is provided on the cap 32 to facilitate attachment of a resilient member 76 to sealingly engage with the valve element 42. The relief valve 22 also operates in a similar manner to that of FIG. 2.

What is claimed is:

1. A pressure relief valve for a fuel tank of a motor vehicle equipped with an evaporative emission control system, said valve comprising:
    a cylindrical hollow casing having end portions said end portions being closed and having an inlet and outlet at said both end portions, respectively, said inlet communicating with the fuel tank and said outlet communicating with the atmosphere;
    a cylindrical movable valve element coaxially disposed within said cylindrical hollow casing and being in spaced relationship thereto and also in space relationship with said both end portions, said cylindrical movable valve element including a cylindrical wall portion and an annular partition wall portion which is integral with the inner surface of the cylindrical wall portion adjacent one end of said cylindrical movable valve element, the one end being adjacent to one hollow casing end portion having the outlet, the annular partition wall portion having at least one radially outward hole therethrough;
    a compression spring interposed between the inner surface of the one hollow casing end portion having the outlet and the annular partition wall portion of said cylindrical movable valve element to bias said cylindrical movable valve element in the direction of another hollow casing end portion having the inlet;
    an annular resilient valve member mounted at its central portion on the annular partition wall portion of said cylindrical movable valve element, said annular resilient valve member having at its peripheral portion a flexible flap portion which is located opposite said compression spring with respect to the annular partition wall portion, the flexible flap portion normally urgingly closing the hole of the annular partition wall portion and opening the hole to introduce atmospheric air therethrough from the outlet of said cylindrical hollow casing to the inlet of said cylindrical hollow casing when fuel vapor pressure in the fuel tank drops bellow zero gage pressure; and
    a cylindrical resilient valve member securely mounted on the another end of said cylindrical movable valve element adjacent to the inlet of said cylindrical hollow casing, said cylindrical resilient valve member being formed with a central bore therethrough and an annular lip portion which is normally urged by said compression spring into sealingly contact with the inner surface of the another hollow casing end portion having the inlet, said cylindrical resilient movable valve member being moved to a position which unseats the lip portion from the inner surface so as to introduce fuel vapor from the fuel tank through the inlet of said cylindrical hollow casing and around said cylindrical movable valve element to the outlet of said cylindrical hollow casing when the fuel vapor pressure in the fuel tank exceeds a predetermined value.

2. A valve as claimed in claim 1, in which the evaporative emission control system includes a fuel storage unit communicable with the fuel tank and the atmosphere, said valve being connected between the fuel vapor storage unit and the fuel tank.

3. A valve as claimed in claim 2, in which the fuel vapor storage unit is a carbon canister.

* * * * *